US010205508B1

(12) United States Patent
Lindsley et al.

(10) Patent No.: US 10,205,508 B1
(45) Date of Patent: Feb. 12, 2019

(54) WIRELESS COMMUNICATION BETWEEN AN OPERATOR OF A REMOTELY OPERATED AIRCRAFT AND A CONTROLLING ENTITY

(71) Applicant: Olaeris, Inc., Fort Worth, TX (US)

(72) Inventors: Edward Lindsley, Burelson, TX (US); Frederick J. Livingston, Raleigh, NC (US); Miguel Abrantes Rufino, Raleigh, NC (US); Michael B. Dodd, Salt Lake City, UT (US)

(73) Assignee: Sqwaq, Inc., Plano, TX (US)

( * ) Notice: Subject to any disclaimer, the term of this patent is extended or adjusted under 35 U.S.C. 154(b) by 0 days.

(21) Appl. No.: 15/493,155

(22) Filed: Apr. 21, 2017

Related U.S. Application Data

(60) Provisional application No. 62/327,399, filed on Apr. 25, 2016.

(51) Int. Cl.
| | |
|---|---|
| *H04W 4/00* | (2018.01) |
| *H04B 7/185* | (2006.01) |
| *B64C 39/02* | (2006.01) |
| *G05D 1/00* | (2006.01) |
| *H04W 84/00* | (2009.01) |

(Continued)

(52) U.S. Cl.
CPC ....... *H04B 7/18506* (2013.01); *B64C 39/024* (2013.01); *G05D 1/0022* (2013.01); *B64C 2201/146* (2013.01); *H04W 84/005* (2013.01); *H04W 84/042* (2013.01); *H04W 84/06* (2013.01)

(58) Field of Classification Search
CPC . H04W 84/005; H04W 84/042; H04W 84/06; H04B 7/18506; B64C 39/024; G05D 1/0022
See application file for complete search history.

(56) References Cited

U.S. PATENT DOCUMENTS

| | | |
|---|---|---|
| 8,155,158 B2 | 4/2012 | Saavedra |
| 8,717,885 B2 | 5/2014 | Arisoylu et al. |
| 9,201,835 B2 | 12/2015 | Akin et al. |

(Continued)

OTHER PUBLICATIONS

"Ocean Vessel WiFi—VSAT and Cellular Bonding", Wei Ming, Apr. 2, 2014, 2 pages. https://forum.peplink.com/t/ocean-vessel-wi-fi-vsat-and-cellular-bonding/2532.

(Continued)

*Primary Examiner* — Stephen M D Agosta
(74) *Attorney, Agent, or Firm* — Michael B. Dodd; Dodd Law Group

(57) ABSTRACT

The present invention extends to methods, systems, devices, apparatus, and computer program products for wireless communication between an operator of a remotely operated aircraft and a controlling entity. A communication converter at a remotely operated aircraft converts between radio communication (e.g., VHF airband) and communication over another wireless network (e.g., over a cellular network). Thus, aspects of the invention can be used to facilitate (e.g., more localized) radio communication between an operator (e.g., pilot) of a remotely operated aircraft and a controlling entity (e.g., a control center) when the operator (e.g., pilot) is physically located outside of (e.g., VHF) radio range from the controlling entity. Accordingly, a two-way voice communication link can be established between the operator and personnel at a control center.

17 Claims, 4 Drawing Sheets

(51) Int. Cl.
*H04W 84/04* (2009.01)
*H04W 84/06* (2009.01)

(56) References Cited

U.S. PATENT DOCUMENTS

| | | | |
|---|---|---|---|
| 9,313,667 B1 | 4/2016 | Daoura | |
| 9,651,944 B2* | 5/2017 | Arwine | G05D 1/0011 |
| 9,688,401 B2* | 6/2017 | Hester, Jr. | B64C 39/024 |
| 2003/0035371 A1 | 2/2003 | Reed et al. | |
| 2005/0251579 A1 | 11/2005 | Ngo et al. | |
| 2006/0149851 A1 | 7/2006 | Matsumoto et al. | |
| 2006/0176861 A1 | 8/2006 | Schmidt | |
| 2007/0297416 A1 | 12/2007 | Boley et al. | |
| 2008/0033604 A1* | 2/2008 | Margolin | G05D 1/0044 701/2 |
| 2008/0130668 A1 | 6/2008 | Balakrishnan et al. | |
| 2008/0253282 A1 | 10/2008 | Kissel | |
| 2008/0267181 A1 | 10/2008 | Monga et al. | |
| 2009/0069957 A1 | 3/2009 | Nakamura | |
| 2010/0015972 A1 | 1/2010 | Hong et al. | |
| 2010/0234071 A1 | 9/2010 | Shabtay et al. | |
| 2010/0302359 A1 | 12/2010 | Adams et al. | |
| 2011/0149849 A1* | 6/2011 | Brownrig | H04L 45/00 370/328 |
| 2012/0170523 A1 | 7/2012 | Civanlar | |
| 2012/0327847 A1 | 12/2012 | Rundquist et al. | |
| 2014/0247721 A1 | 9/2014 | Arisoylu et al. | |
| 2015/0078332 A1 | 3/2015 | Sidhu et al. | |
| 2015/0168144 A1 | 6/2015 | Barton et al. | |
| 2016/0006695 A1 | 1/2016 | Prodoehl et al. | |
| 2016/0328979 A1* | 11/2016 | Postrel | B64C 39/024 |

OTHER PUBLICATIONS

"Cellular Bonding", Dr. Rony Ohayon and Baruch Altman, TVTechnology, Feb. 1, 2012, 3 pages. https://www.tvtechnology.com/expertise/cellular-bonding.
"Ocean Vessel WiFi—VSAT and Cellular Bonding", Wei Ming, 2 pages. https://forum.peplink.com/t/ocean-vessel-wi-fi-vsat-and-cellular-bonding/2532.
"A Scheme of Ad-hoc-Based D2D Communication in Cellular Netoworks", Haipeng Yao et. al., Ad Hoc & Sensor Wireless Networks, vol. 32, pp. 115-130, Jan. 24, 2016, 16 pages.
"Non-Final Office Action Issued in U.S. Appl. No. 15/722,499", dated Feb. 16, 2018, 24 Pages.
"Non-Final Office Action Issued in U.S. Appl. No. 14/671,009", dated Jan. 17, 2017, 17 Pages.
"Non-Final Office Action Issued in U.S. Appl. No. 14/671,009", dated Jul. 11, 2017, 22 Pages.
"Notice of Allowance Issued in U.S. Appl. No. 14/671,009", dated Sep. 14, 2017, 7 Pages.

* cited by examiner

WIRELESS COMMUNICATION BETWEEN AN OPERATOR OF A REMOTELY OPERATED AIRCRAFT AND A CONTROLLING ENTITY

CROSS-REFERENCE TO RELATED APPLICATIONS

This application claims the benefit of and priority to U.S. Provisional Patent Application Ser. No. 62/327,399 entitled "Local Radio Communication Between A Remotely Operated Aircraft And A Control Tower And Prioritized Transmission Of Different Data Types Over Bonded Communication Channels", filed Apr. 25, 2016 by Edward Lindsley et al., the entire contents of which are expressly incorporated by reference.

BACKGROUND

1. Background and Relevant Art

During operation (e.g., in the air as well as on the ground), an aircraft pilot can communicate with various different controlling entities. Communication can include one or more different types of radio communication as well as other types of communication (e.g., digital). For example, an aircraft pilot can communicate with controlling entities, such as, for example, Area Control Centers (ACCs), also known as a "Centers" (in the United States referred to as Air Route Traffic Control Centers (ARTCCs)), Terminal Control Centers, Approach Control Centers, Airport Control Centers, Ground Control Centers, etc., during a journey.

BRIEF SUMMARY

The present invention extends to methods, systems, devices, apparatus, and computer program products for wireless communication between an operator of a remotely operated aircraft and a controlling entity. A remotely operated aircraft is operated by an operator (e.g., pilot) from a control station. The operator can use the control station to fly the remotely operated aircraft past line of sight. The remotely operated aircraft can be certified for past line of sight flight by appropriate government agencies and/or regulatory authorities.

The remotely operated aircraft includes wireless communication components for wireless communication via one or more wireless communication networks. The remotely operated aircraft also includes radio communication components for radio communication via a radio network. The remotely operated aircraft further includes a communication converter. The communication converter can convert between wireless communication formats compatible for transmission via the one or more wireless networks and radio communication formats compatible for transmission via the radio network and vice versa.

In one aspect, the radio components are used to receive wireless communication via the radio network. The wireless communication is in a radio format compatible for transmission over the radio network. The wireless communication is received from an aircraft control center. The communication converter converts the wireless communication from the radio format to another format. The other format is compatible for transmission over another wireless communication network. The wireless communication components are used to send the wireless communication in the other format via the other wireless communication network. The wireless communication is sent to a control station used to control the remotely operated aircraft.

In another aspect, the wireless communication components are used to receive other wireless communication (that may be responsive to the wireless communication) via a (e.g., the other) wireless communication network. The other wireless communication is in a (e.g., the other) format compatible for transmission over the (e.g., other) wireless communication network. The other wireless communication is received from the control station used to control the remotely operated aircraft. The communication converter converts the other wireless communication from the format to the radio format. The radio components are used to send the other wireless communication in the radio format to the aircraft control center via the radio network.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

The specific features, aspects and advantages of the present invention will become better understood with regard to the following description and accompanying drawings where.

DETAILED DESCRIPTION

Figure 1:
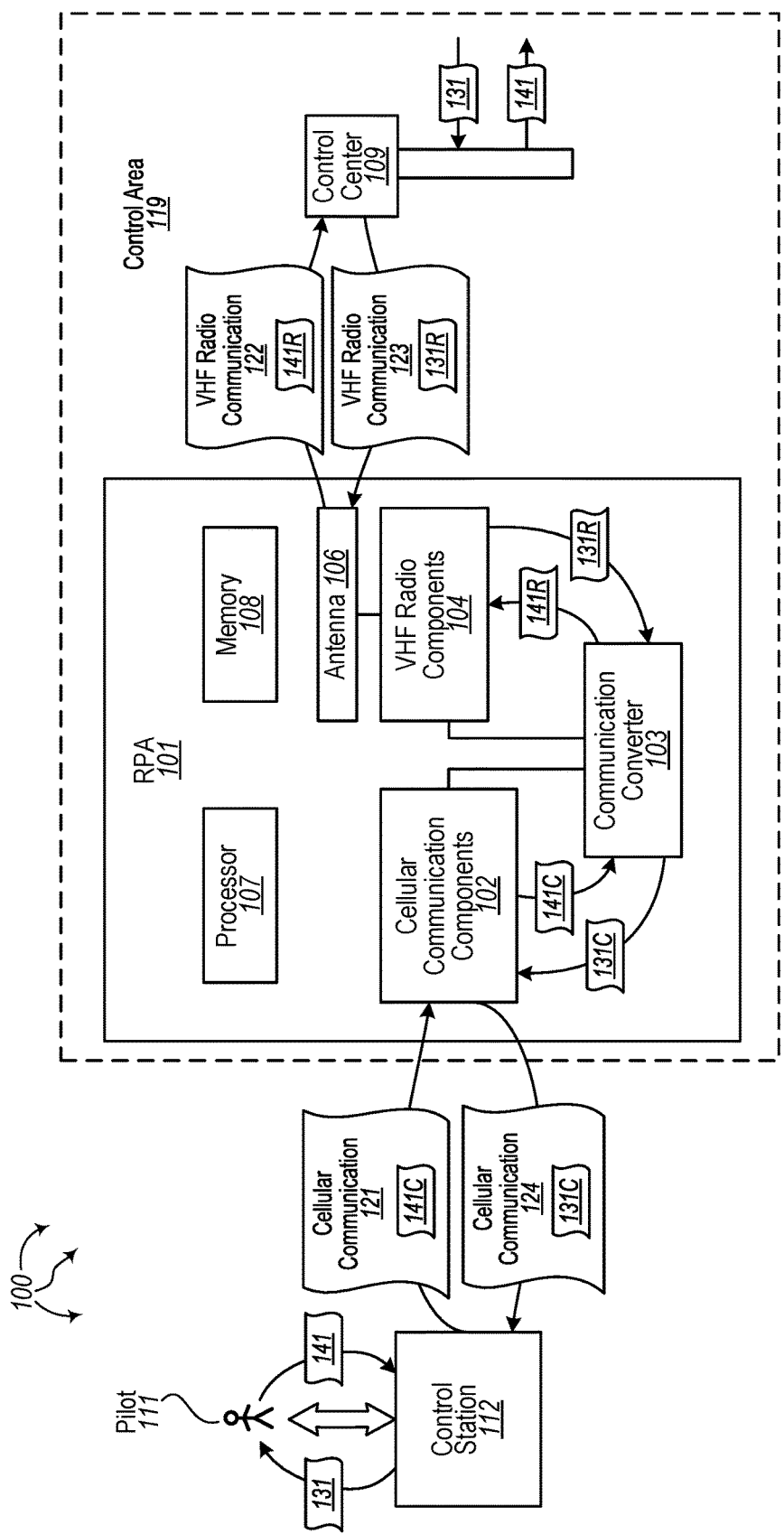
FIG. 1 illustrates an example architecture that facilitates radio communication between an operator of a Remotely Operated Aircraft and a control center.

The present invention extends to methods, systems, devices, apparatus, and computer program products for wireless communication between an operator of a remotely operated aircraft and a controlling entity. A remotely operated aircraft is operated by an operator (e.g., pilot) from a control station. The operator can use the control station to fly the remotely operated aircraft past line of sight. The remotely operated aircraft can be certified for past line of sight flight by appropriate government and/or regulatory authorities, such as, for example, the Federal Aviation Administration (FAA), Transport Canada Civil Aviation (TCCA), European Aviation Safety Agency (EASA), Civil Aviation Administration of China (CAAC), etc. for the country in which it is operating.

The remotely operated aircraft includes wireless communication components (e.g., one or more modems) for wireless communication via one or more wireless networks. The one or more wireless networks can span various communication channels (e.g., bonded and/or redundant cellular channels, satellite channels, WiMax channels, etc.) between the remotely operated aerial vehicle and the control station. In general, the control station uses the wireless communication channels to exchange data with the remotely operated aircraft. For example, the control station can use the wireless communication channels to communicate (data and/or voice) with the remotely operated aerial vehicle, to send operator commands to the remotely operated aerial vehicle, to receive vehicle status from remotely operated aerial vehicle, etc.

The remotely operated aircraft also includes radio communication components (e.g., transceiver and antenna) for radio communication via a radio network. For example, the remotely operated aerial vehicle can include a radio system for radio communication with controlling entities (e.g., control centers). The radio system can include a transmitter, a receiver, and an antenna. In one aspect, the radio system facilitates Very High Frequency (VHF) radio communication (e.g., between 30 MHz to 300 MHz and more particularly VHF airband communication in frequencies between 108 MHz and 137 MHz) and/or Ultra High Frequency (UHF) radio communication (e.g., between 300 MHz and 3 GHz). However, other communication mechanisms are also contemplated. The receiver can receive radio communication (e.g., VHF and/or UHF communication) from a controlling entity (e.g., a control center) or other aircraft. The transmitter can transmit radio communication (e.g., VHF and/or UHF communication) to a controlling entity (e.g., a control center) or other aircraft. The antenna can convert electric power into radio waves, and vice versa.

To transmit, the transmitter supplies an electric current oscillating at radio frequency (e.g., a high frequency alternating current (AC)) to the antenna's terminals. The antenna radiates the energy from the current as electromagnetic waves (i.e., radio waves) at the radio frequency. To receive, the antenna intercepts some of the power of an electromagnetic wave in order to produce a tiny voltage at its terminals, that is applied to a receiver to be amplified.

The remotely operated aircraft further includes a communication converter. The communication converter can convert between wireless communication formats compatible for transmission via the one or more wireless networks and radio communication formats compatible for transmission via the radio network and vice versa. For example, the communication converter can convert communication from cellular (or satellite) to VHF radio (e.g., VHF airband communication in frequencies between 108 and 137 MHz.) and/or UHF radio and vice versa. Accordingly, an operator (or pilot) flying a remotely operated aircraft from the control station can communicate with a controlling entity (e.g., a control center) using VHF radio and/or UHF radio communication as if the operator (or pilot) was essentially in the same physically location as the remotely operated aircraft. That is, VHF radio and/or UHF radio transmissions can originate from the remotely operated aircraft and VHF radio and/or UHF radio waves can be received at the remotely operated aircraft.

In one aspect, the radio components are used to receive wireless communication via the radio network (e.g., VHF airband). The wireless communication is in a radio format compatible for transmission over the radio network. The wireless communication is received from an aircraft control center. The communication converter converts the wireless communication from the radio format to another format. The other format is compatible for transmission over another wireless communication network (e.g., cellular channels, satellite channels, WiMax channels, etc.). The wireless communication components are used to send the wireless communication in the other format via the other wireless communication network. The wireless communication is sent to a control station used to control the remotely operated aircraft.

In another aspect, the wireless communication components are used to receive other wireless communication (that may be responsive to the wireless communication) via a (e.g., the other) wireless communication network (e.g., cellular channels, satellite channels, WiMax channels, etc.). The other wireless communication is in a (e.g., the other) format compatible for transmission over the (e.g., other) wireless communication network. The other wireless communication is received from the control station used to control the remotely operated aircraft. The communication converter converts the other wireless communication from the format to the radio format. The radio components are used to send the other wireless communication in the radio format to the aircraft control center via the radio network (e.g., VHF airband).

Accordingly, aspects of the invention can be used to facilitate (e.g., more localized) radio communication between an operator (e.g., pilot) of a remotely operated aircraft and a controlling entity (e.g., a control center) when the operator (e.g., pilot) is physically located outside of (e.g., VHF and/or UHF) radio range from the controlling entity. In some aspects, a remotely operated aircraft is a certified Remotely Piloted Aircraft (RPA) (and is potentially unnamed, for example, an Unmanned Aerial Vehicle (UAV)) being controlled by a certified pilot.

A remotely operated aircraft can be a rotor-based UAV that includes a plurality of rotors. In some aspects, a rotor-based UAV is a quad-rotor UAV. In other aspects, a rotor-based UAV includes five or more rotors. A rotor based UAV can use rotors for one or more of: lift, maneuvering, and to change orientation, including vertical takeoff and landing ("VTOL").

In this description and the following claims, "Airband" or "Aircraft band" is defined as a group of frequencies in the VHF radio spectrum allocated to radio communication in civil aviation, sometimes also referred to as VHF, or phonetically as "Victor". Different sections of the band are used for radio navigational aids and air traffic control. The VHF airband can use frequencies between 108 MHz and 137 MHz. The lowest 10 MHz of the band, from 108-117.95 MHz, can be split into 200 narrow-band channels of 50 kHz. These can be used for navigational aids such as VHF Omni Directional Radio Range ("VOR") beacons, and precision approach systems such as Instrument Landing System ("ILS") localizers.

Aircraft communications radio operations can use amplitude modulation (AM), such as, for example, A3E double sideband with full carrier on VHF and UHF, and J3E single sideband (SSB) with suppressed carrier on HF. AM and SSB permit stronger stations to override weaker or interfering stations. Alternative analog modulation schemes, such as the "CLIMAX" multi-carrier system and offset carrier techniques can also be used. Aspects of the invention can also be used when airband communication is facilitated with digital radios.

Turning to FIG. 1, FIG. 1 illustrates an example architecture 100 that facilitates radio communication between pilot 111 of a Remotely Piloted Aircraft (RPA) 101 and control center 109. Architecture 100 includes RPA 101, control center 109, control station 112, and pilot 111. In general, pilot 111 uses control station 112 to communicate with and control (e.g., flight characteristics of) RPA 101. In one aspect, pilot 111 is a certified pilot operating RPA 101 past line of sight and possibly a significant distance away, for example, from another state or country. RPA 101 can be certified for past line of sight flight by appropriate government and/or regulatory authorities, such as, for example, the Federal Aviation Administration (FAA), Transport Canada Civil Aviation (TCCA), European Aviation Safety Agency (EASA), Civil Aviation Administration of China (CAAC), etc. for the country in which it is operating.

Control station 112 can communicate with RPA 101 using wireless technologies including bonded and/or redundant cellular channels, satellite channels, WiMax channels, etc. For example, control station 112 can use cellular communication to communicate with (both send data and commands to and receive data and telemetry from) RPA 101. Cellular communication can be used to transfer data as well as voice communication between control station 112 and RPA 101. Pilot 111 can utilize audio input device(s) (e.g., a microphone) and audio output devices (e.g., speakers, headphones, etc.) at control station 112 to exchange voice communication (or other audio data) with RPA 101.

As depicted, RPA 101 includes cellular communication components 102 (e.g., circuitry), communication converter 103, VHF radio communication components 104 (e.g., transmitter and receiver circuitry), antenna 106, processor 107, and memory 108. Cellular communication components 102 are configured to exchange (send and receive) cellular communication (voice and/or data) with other systems, such as, for example, control station 112. Communication converter 103 is configured to convert (voice and/or data) between cellular communication and VHF (e.g., VHF airband) radio communication. VHF radio communication components 104 are configured to exchange (send and receive) VHF radio communication (voice and/or data) with other systems, such as, for example, control center 109.

During operation, pilot 111 can maneuver RPA 101 (e.g., on the ground and/or in the air) within control area 119. In one aspect, pilot 111 flies RPA 101 into control area 119 from elsewhere. Control area 119 can be a geographical area of control, for example, an area around an airport, a flight information region, etc. controlled by control center 109. Control center 109 can control air traffic around an airport, ground traffic at an airport, etc. Control center 109 can be an Air Route Traffic Control Center (ARTCC), a TRACON (Terminal Radar Approach Control), an oceanic airspace controller (including oil rig mounted components), etc.

Figure 2A:
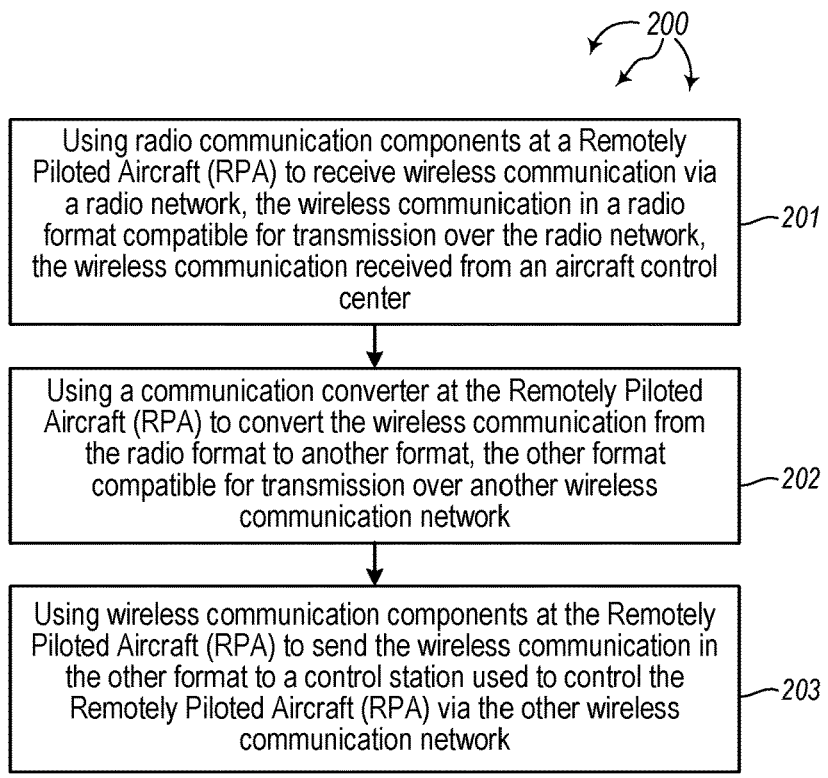
FIG. 2A illustrates a flow chart of an example method for transmitting wireless communication from a control center to an operator of a Remotely Operated Aircraft.

FIG. 2A illustrates a flow chart of an example method 200 for transmitting wireless communication from a control center to an operator of a Remotely Operated Aircraft. Method 200 will be described with respect to the components and data of architecture 100.

Upon detecting RPA 101 in control area 119 (e.g., using radar), personnel at control center 109 can input voice communication 131 (e.g., can speak) into a connected audio input device (e.g., a microphone) at control center 109. Voice communication 131 can be intended for pilot 111 (although others listening on the same frequency can also hear voice communication 131). Control center 109 can use a radio system (e.g., a transmitter and antenna) to transmit voice communication 131 in radio format 131R contained in VHF radio (e.g., airband) communication 123 (i.e., radio waves).

Method 200 includes using radio communication components at a Remotely Piloted Aircraft (RPA) to receive wireless communication via a radio network, the wireless communication in a radio format compatible for transmission over the radio network, the wireless communication received from an aircraft control center (201). For example, antenna 106 can receive the VHF radio (e.g., airband) communication 123 and convert the radio waves into electric current. The electric current can be processed at a receiver included in VHF radio communication components 104. The receiver and antenna 106 can interoperate to access voice communication 131 in radio format 131R.

Method 200 includes using a communication converter at the Remotely Piloted Aircraft (RPA) to convert the wireless communication from the radio format to another format, the other format compatible for transmission over another wireless communication network (202). For example, communication converter 103 can convert the voice communication 131 in radio format 131R into voice communication 131 in cellular format 131C. Cellular format 131C is compatible for transmission over a cellular network, such as, for example, a 3G cellular network, a 4G cellular network, or some other type of cellular network. Cellular format 131C can include one or more data packets representative of the content of VHF radio communication 123 (and thus also representative of the content of voice communication 131).

Method 200 includes using wireless communication components at the Remotely Piloted Aircraft (RPA) to send the wireless communication in the other format to a control station used to control the Remotely Piloted Aircraft (RPA) via the other wireless communication network (203). For example, cellular communication components 102 (e.g., a cellular modem) can transmit the voice communication 131 in cellular format 131C contained in cellular communication 124 over the cellular network.

Control station 112 can receive cellular communication 124 containing voice communication 131 in cellular format 131C over the cellular network. Cellular components at control station 112 (e.g., a cellular modem) can process cellular communication 124 to reform voice communication 131. Control station 112 can render voice communication 131 to pilot 111 at an audio output device, such as, headphones or speakers.

Figure 2B:
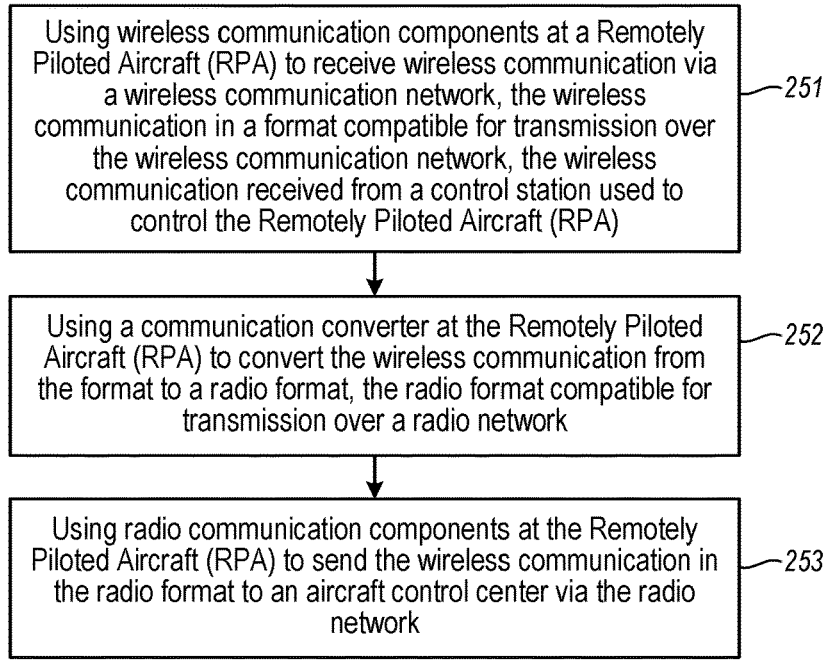
FIG. 2B illustrates a flow chart of an example method for transmitting wireless communication from an operator of a Remotely Operated Aircraft to a control center.

FIG. 2B illustrates a flow chart of an example method 250 for transmitting wireless communication from an operator of a Remotely Operated Aircraft to a control center. Method 200 will be described with respect to the components and data of architecture 100.

Pilot 111 can respond to voice communication 131. Pilot 111 can enter voice communication 141 (e.g., can speak) into a connected audio input device (e.g., a microphone) at control station 112. Voice communication 141 can be intended for personal at control center 109 (although others listening on the same frequency can also hear voice communication 141). Control station 112 can use cellular components (e.g., a cellular modem) to transmit voice communication 141 in cellular format 141C contained in cellular communication 121. Cellular format 141C can include one or more data packets representative of the content of Very High Frequency (VHF) radio communication.

Method 250 includes using wireless communication components at a Remotely Piloted Aircraft (RPA) to receive wireless communication via a wireless communication network, the wireless communication in a format compatible for transmission over the wireless communication network, the wireless communication received from a control station used to control the Remotely Piloted Aircraft (RPA) (251). For example, cellular communication components 102 can receive cellular communication 121 from control station 112. Cellular communication components 102 can process cellular communication 121 to access voice communication 141 in cellular format 141C.

Method 250 includes using a communication converter at the Remotely Piloted Aircraft (RPA) to convert the wireless communication from the format to a radio format, the radio format compatible for transmission over a radio network (252). For example, communication converter 103 can convert the voice communication 141 in cellular format 141C into voice communication 141 in radio format 141R. Radio format 141R is compatible for transmission over a radio network.

Method 250 includes using radio communication components at the Remotely Piloted Aircraft (RPA) to send the wireless communication in the radio format to an aircraft control center via the radio network (253). For example, a transmitter included in VHF radio communication components 104 can form electric currents representing VHF radio (e.g., airband) communication 122. Antenna 106 can convert the electric power into radio waves. The transmitter and antenna 106 can interoperate to transmit voice communication 141 in radio format 141R contained in VHF radio (e.g., airband) communication 122 (i.e., radio waves)

The radio system at control center 109 can receive VHF radio (e.g., airband) communication 122 containing voice communication 141 in radio format 141R.

For example, an antenna at control center 109 can receive the VHF radio (e.g., airband) communication 122 and convert the radio waves into electric current. The electric current can be processed at a receiver included in the radio system. The receiver and the antenna can interoperate to process VHF radio (e.g., airband) communication 122 to reform voice communication 141. Voice communication 141 can be rendered at an audio output device, such as, headphones or speakers at control center 109.

Thus, RPA 101 can essentially function as a mobile communication converter capable of converting between cellular and VHF communication and vice versa. Accordingly, a two-way voice communication link can be established between pilot 111 and personnel at control center 109 even though pilot 111 is outside of control area 119 (or otherwise out of VHF radio range from control center 109). One part of the two-way communication link is facilitated by the cellular network and another part of the two-way communication link is facilitated by the radio network.

Aspects of the invention also include converting between UHF radio communication and wireless communication on other wireless networks. For example, communication converter 103 (or another similar communication converter) can be configured to convert (voice and/or data) between cellular communication and UHF radio communication and vice versa. UHF radio communication components at RPA 101 can be configured to exchange (send and receive) UHF radio communication (voice and/or data) with other systems, such as, for example, control center 109.

Aspects of the invention also include conversion between VHF and/or UHF radio communications and other wireless formats, such as, satellite, Wi-Fi, WiMax, etc.

In one aspect, a handheld transceiver (e.g., aircraft radio) is mounted to RPA 101. Antenna 106 can be a 5-watt hi gain antenna. Pilot 111 wears a headset and can communicate to the control center 109 through a scrambled encrypted cellular control link, up to the handheld transceiver that is within VHF range of control center 109. This significantly increases safety for RPA 101 and other aircraft within controlled airspace. For example, pilot 111 can be in Miami while controlling RPA 101 in Los Angeles and even cause RPA 111 to enter the traffic pattern in Los Angeles. Pilot 111 can talk to a local control tower in Los Angeles via a cellular link between control station 112 and RPA 101 and a radio link between RPA 101 and the local control tower.

Similar mechanisms can be used for a transponder included in RPA 101. Ground control software can include a user adjustable setting to squawk whatever (e.g., 4-digit) transponder code is either demanded from a control center (e.g., tower) or to identify the particular mission the aircraft is flying so air traffic control knows what the aircraft is doing. A transponder can include a separate circuit board attached to a 5-watt antenna but controlled through a cellular (or other wireless) link.

Any of a variety of different transponders can be used. For example, any of Mode A, Mode C, Mode S, Automatic Dependent Surveillance-Broadcast ("ADS-B") can be used.

If the control tower says "RPA 101, turn left heading 090, ascend to one thousand two hundred, Squawk 1256 and ident", the message can be transmitted via VHF to RPA 101, converted to cellular communication at RPA 101, and transmitted to control station 112 via a cellular network. Pilot 111 can repeat those instructions verbally to verify she or he understands them accurately. The repeated instructions can be transmitted via the cellular network to RPA 101, converted to radio communication at RPA 101, and transmitted via VHF to the control tower. Pilot 111 can also dial the transponder to a new code of "1256" and touch the "ident" button which essentially reacts like a sonar ping on the controller's radar screen. The onboard transponder continues transmitting that code to ground antennas and other aircraft until changed. Both air traffic control and other aircraft can then see RPA 101. RPA 101 can be represented in radar similar to other smaller craft.

RPA 101 may use various Federal Aviation Administration (FAA) transponder codes assigned specifically for use by remotely operated aircraft. For example, these transponder codes can begin with a zero and have any of three recommendations:

0911—Emergency response missions given priority vectoring over other remotely operated aircraft flying in the airspace from 0-400' Above Ground Level (AGL), 0060—Fast, direct routes at approximately 300' AGL like pipeline monitoring or beach patrols. (It looks like GO on the display), 0510—Low and slow at approximately 200' like power line inspections that may stop a lot. (It looks like SLO on the display).

In general, analog and/or digital systems can be used to monitor and control remotely operated aircraft (e.g., RPA 101). Monitoring and control equipment can be co-located with and/or separate one another. Information exchanged between remotely operated aircraft and monitoring and control equipment can be relayed over a wired and/or wireless communication networks.

Remotely operated aircraft can include computer network connectivity components (e.g., a Network Interface Card ("NIC') or cellular modem) for wired or wirelessly connecting the monitoring equipment to a computer network. As such, modules, algorithms, components, etc., for controlling the flight of remotely operated aircraft (e.g., direction, speed, acceleration, pitch, yaw, roll) can also be connected to other modules, algorithms, components, etc., over (or be part of)

a network, such as, for example, a Local Area Network ("LAN"), a Wide Area Network ("WAN"), and even the Internet. Accordingly, the modules, algorithms, components, etc., for controlling the flight of remotely operated aerial vehicles (e.g., direction, speed, acceleration, pitch, yaw, roll) as well as any other connected computer systems and their components (e.g., in a control center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Prioritized Transmission of Different Data Types Over Bonded Communication Channels The present invention extends to methods, systems, devices, apparatus, and computer program products for prioritized transmission of different data types over bonded communication modules. Embodiments of the invention include a remotely operated aerial vehicle that can wirelessly transmit and receive various data types over a bonded mobile network and a control device (which can be fixed or portable) capable of receiving data transmitted from the remotely operated aerial vehicle and transmitting data to it. The control device can be similar to control station 112.

The remotely operated aerial vehicle is user-configurable, allowing different input data types to be assigned different priorities. The remotely operated aerial vehicle is able to selectively transmit and/or receive higher priority data such that lower priority data is sacrificed first in the event of degraded quality of the network link. Quality degradation may be in terms of reduced signal strength, reduced bandwidth or increased latency of the bonded link as a whole, or of one or more of the individual links that are bonded.

Communication between the remotely operated aerial vehicle and control device can be via a cellular or other wireless network. The control device includes a (e.g., Internet Protocol (IP)) network port providing a connection to the cellular or other wireless network. The port is able to re-assemble data streams (e.g., IP packets) received from the remotely operated aerial vehicle and generate output data streams corresponding to the remotely operated aerial vehicle input data sources. Both the remotely operated aerial vehicle and the control device include the ability to detect missing data packets and request packet resends.

In some aspects, different types of data are communicated between a remotely operated aerial vehicle (e.g., an unmanned aerial vehicle (UAV)) and a control device (e.g., where a pilot remotely controls the UAV) over bonded communication modules. Data transmission can be essentially simultaneous with each data type assigned a different priority.

For example, video from cameras mounted to remotely operated aerial vehicle (e.g., a UAV) and telemetry data indicating the status of vehicle systems can be essentially simultaneously transmitted from the remotely operated aerial vehicle to the control device. Command data for controlling the vehicle can also be essentially simultaneously received at the vehicle from the control station. Radio communication can also be exchanged with various control centers. The video, telemetry data, command data, and radio data can be transferred over bonded communication channels (e.g., from among 3G cellular, 4G cellular, satellite, Wi-Fi, WiMAX, etc.) at the remotely operated aerial vehicle.

Radio data (e.g., corresponding to and/or representing VHF airband communication), telemetry data, and command data can have increased mission importance relative to video. Failure to transmit telemetry data and/or receive command data could cause the control of the vehicle to be lost. For example, for a UAV, losing ground-to-aircraft command data could result in total loss of the UAV. Failure to transmit or receive control center (e.g., tower) radio communications has safety implications for the UAV as well as other aircraft.

On the other hand, interruption of a video stream would not adversely affect the integrity and/or safety of the vehicle (or other aircraft). Thus, radio data, telemetry data, and command data can be given higher priority relative to video. In the event of a malfunction or degraded quality of a link, video and other lower priority data can be sacrificed to increase the chances of tower radio data, telemetry data, and/or command data being appropriately transferred.

Figure 3:
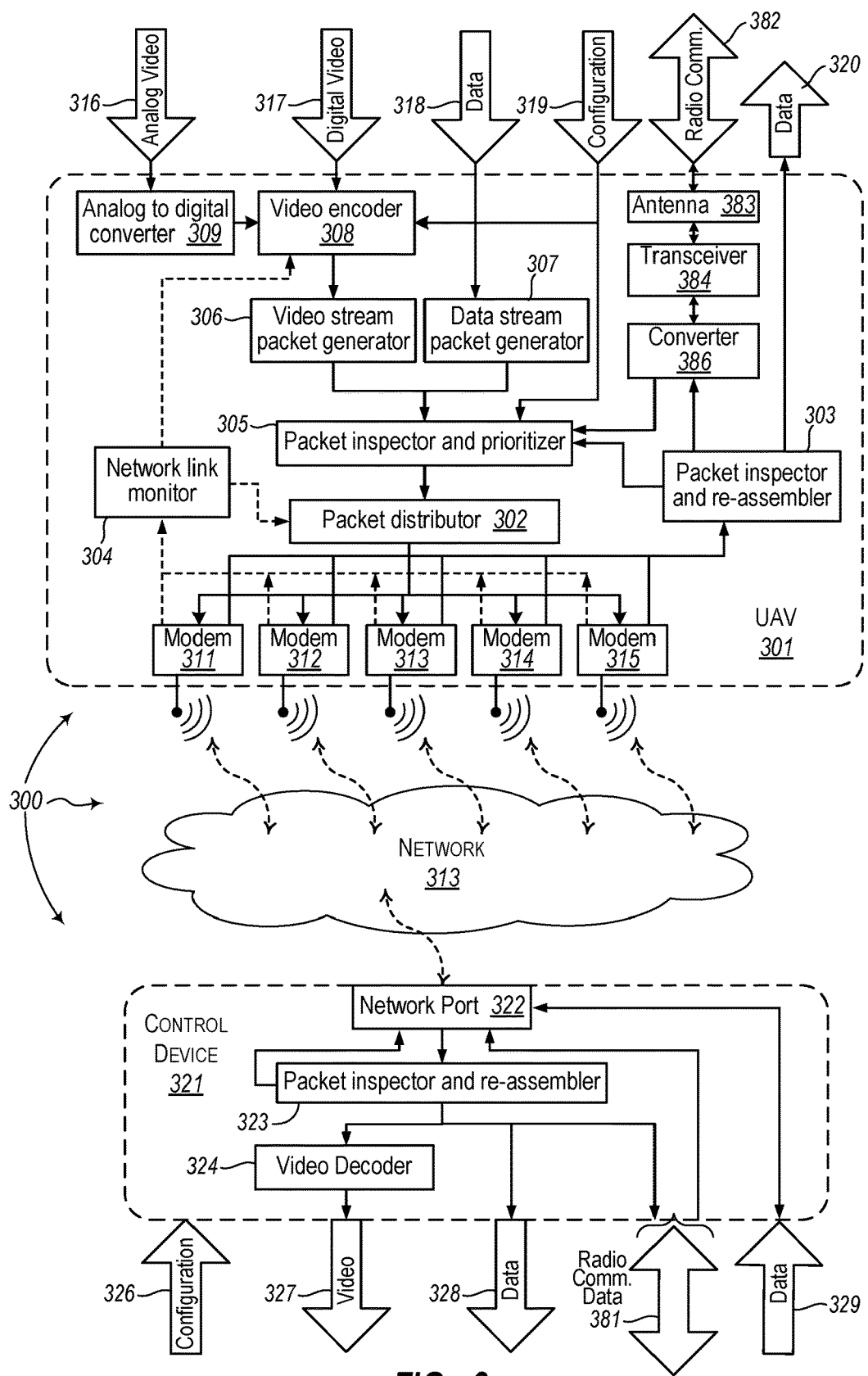
FIG. 3 illustrates an example architecture that facilitates prioritized transmission of different data types over bonded communication modules.

FIG. 3 illustrates an example architecture 300 that facilitates prioritized transmission of different data types over bonded communication modules. As depicted, architecture 300 includes a view of Unmanned Aerial Vehicle (UAV) 301, control device 321, and network 331 (e.g., a cellular network). In one aspect, UAV 301 is certified for past line of sight flight by appropriate government and/or regulatory authorities, such as, for example, the Federal Aviation Administration (FAA), Transport Canada Civil Aviation (TCCA), European Aviation Safety Agency (EASA), Civil Aviation Administration of China (CAAC), etc. for the country in which it is operating. UAV 301 can be powered on and a certified pilot (e.g., through control device 321) can be maneuvering UAV 301 on the ground or in the air.

UAV 301 includes packet distributor 302, packet inspector and re-assembler 303, network link monitor 304, packet inspector and prioritize 305, video stream packet generator 306, data stream packet generator 307, video encoder 308, analog to digital converter 309, modems 311, 312, 313, 314, and 315, antenna 383, transceiver 384, converter 386, and one or more other antennas (not shown). The individual bandwidth provided by each of modems 311, 312, 313, 314, and 315 can be bonded into a bonded link.

Packet distributor 302 is configured to inspect headers of incoming data (e.g., Internet Protocol (IP) packets) to establish their priority. Based on priority and a packet distribution scheme, packet distributor 302 routes packets to individual modems from among modems 311, 312, 313, 314, and 315 taking into account modem link qualities.

Packet inspector and re-assembler 303 is configured to receive data (e.g., IP packets) from modems 311, 312, 313, 314, and 315 and place them in a buffer. Packet inspector and re-assembler 303 can search the buffer for the next packet in the sequence based on the packet sequence numbers. If a packet is still missing after a timeout, a resend request is sent with higher priority. Once the next packet in the sequence has been found it is output via the data output port 320.

For outgoing radio (e.g., VHF airband) communication, a packet can be passed to converter 386 for output via radio communication 382. Converter 386 can convert the packet for radio transmission by transceiver 384. Transceiver 384 can convert the packet to electrical current. Antenna 383 can in turn transmit the electrical current as radio waves (e.g., including radio communication directed to a control center (e.g., tower)). In one aspect, transmitted radio waves are in the VHF airband radio communication frequencies (but can also be in other VHF frequencies or can be in UHF frequencies).

For incoming radio waves at radio 382, antenna 383 can convert received radio waves to electrical currents. Transceiver 384 can process the electrical currents into radio communication. Converter 386 can convert the radio communication to data packets. Converter 386 can send the data packets to packet inspector and prioritizer 305. In one aspect, received radio waves are in the VHF airband radio communication frequencies (but can also be in other VHF frequencies or can be in UHF frequencies). In general, converter 386 can include functionality similar to communication converter 103.

Network link monitor 304 is configured to monitor the link quality of each of modems 311, 312, 313, 314, and 315. Network link monitor 304 can send monitored link quality information to other modules of UAV 301.

Packet inspector and prioritizer 305 is configured to inspect headers of incoming data (e.g., IP packets) to establish a data type. A data type can be, for example, one of one or more different types of radio communication, data, video, or audio. Using a data type prioritizing scheme and data type priorities provided via configuration input, packet inspector and prioritizer 305 can insert a priority identifier in each (e.g., IP packet) header.

Video stream packet generator 306 takes an encoded video stream and breaks it up into a sequence of (e.g., IP) packets. Video stream packet generator 306 can insert a label in each packet header to identify it as a video stream packet. Video stream packet generator 306 can also insert a packet sequence number in the header to allow re-assembling packets in the correct order once received by the receiver.

Data stream packet generator 307 is configured to take an input data stream and break it up into a sequence of (e.g., IP) packets. Data stream packet generator 307 can insert a label in each packet header to identify it as a data packet. In some embodiments, different labels are also used to distinguish between different types of data, such as, for example, operational data, status data, etc. Different types of data can come from different systems, such as, flight systems (e.g., at, integrated with, and/or attached to UAV 301). Different types of data can include radio data, power data (e.g., battery status), engine data, environmental data (e.g., temperature, altitude, direction, etc.), etc.

Video encoder 308 is configured to encode a digital video stream into a lower bitrate format by employing a compression algorithm (such as H.264). A target bitrate can be specified via configuration input. The degree of compression can be varied based on feedback from the network link monitor 304, so that the bitrate is adjusted to correspond to available bandwidth of the bonded link.

Analog to digital converter 306 is configured to covert analog video to digital video for processing at video encoder 308.

As described, antenna 383 can convert received radio waves (e.g., from a control tower) to electrical currents. Transceiver 384 can process the electrical currents into radio communication. Converter 386 can convert the radio communication to data packets. Converter 386 can send the data packets to packet inspector and prioritizer 305.

In some embodiments, UAV 301 also includes one or more separate audio input channels (analog and/or digital). In these embodiments, UAV 301 also includes appropriate components for converting analog audio to digital audio, encoding a digital audio stream, and breaking an audio stream into a sequence of packets.

Accordingly, UAV 301 can be connected to and exchange data with other co-located (e.g., vehicle) systems. For example, analog to digital converter 309 can receive analog video from analog video input 316. Analog video can be captured at analog cameras (e.g., at, integrated with, and/or attached to UAV 301). Video encoder 308 can receive digital video from digital video input 317. Digital video can be captured at digital cameras (e.g., at, integrated with, and/or attached to UAV 301). Analog to digital converter 309 can convert analog video into digital video. Video encoder 308 can encode digital video and converted analog video into a video stream.

Alternately or in combination, analog and/or digital audio can be captured at condensers (e.g., at, integrated with, and/or attached to UAV 301). An audio encoder can encode digital audio and convert analog audio into an audio stream.

Data stream packet generator 307 can receive data (e.g., telemetry data of different data types) from data input 318. Data can originate at other (e.g., vehicle, flight, etc.) systems (e.g., at, integrated with, and/or attached to UAV 301). Data stream packet generator 307 can turn data 318 into a data stream. Packet inspector and prioritizer 305 can receive configuration (e.g., telemetry data of different data types) from device configuration input 319. Configuration can indicate the configuration of other (e.g., vehicle, flight, etc.) systems (e.g., at, integrated with, and/or attached to UAV 301).

Packet inspector and re-assembler 303 can receive data (e.g., IP packets) from modems 311, 312, 313, 314, and 315 and formulate data (e.g., commands) to output at data output 320. Data can be output to other (e.g., vehicle) systems (e.g., at, integrated with, and/or attached to UAV 301) to give commands to those other systems.

As depicted, control device 321 includes network port 322 (e.g., a wired connection), inspector and re-assembler 323, and video decoder 324.

Inspector and re-assembler 323 is configured to receive data (e.g., IP packets) from network 331 through network port 322. Inspector and re-assembler 323 can sort data into buffers based on data type. A data type can be, for example, one of one or more different types of radio communication, data, video, or audio. Inspector and re-assembler 323 searches each buffer for the next packet in the sequence of that data type based on the packet sequence numbers. If a packet is still missing after a timeout, a resend request is sent. Once the next packet in the sequence has been found for a packet type, it is output to the appropriate stream. Video data can be output to video decoder 324, while data packets are output to the data output port 328. Radio communication can be transferred via radio communication data 381 (e.g., a headset and microphone used by an operator of UAV 301).

Video decoder 324 is configured to decode video data (e.g., packets) into a digital video stream. Video decoder 324 can output a digital video stream at video output 327.

When appropriate, control device 321 can also include an audio decoder to decode audio data (e.g., packets) (which may be radio communication) into a digital audio stream and output the digital audio stream at an audio output port.

Data output at data output port 328, digital video stream data output at video output 327, and an audio data stream output at an audio output port can be presented at one or more output devices, for example, a display screen and speakers, associated with control device 321. Control device 321 can also receive configuration and data (e.g., commands for controlling UAV 301 through configuration input port 326 and data input port 329 respectively. Configuration input port 326 and data input port 329 can be connected to one or more input devices (e.g., vehicle control devices, such as, flight control devices) associated with control device 321. Input devices can include keyboards, mice, flight sticks, etc. manned, for example, by a vehicle operator (e.g., pilot).

Thus, generally, UAV 301 can transmit one or more of radio communication, other audio, video, and telemetry data over network 331 to control device 321. Control device 321 can receive one or more of radio communication, other audio, video, and telemetry data over network 331 from UAV 301. Similarly, control device 321 can send radio communication and command data to UAV 301 over network 331. UAV 301 can receive radio communication and command data over network 331 from control device 321.

A packet distribution scheme can be used to distribute data (e.g., IP packets). The packet distribution scheme minimizes disruption in transmission of higher priority data types when the signal quality degrades. Any of a variety of different schemes for distributing data (e.g., IP packets) between individual modems (e.g., from among modules 311, 312, 313, 314, and 315) based on their priority can be used.

In one aspect, telemetry navigation data is highest priority, Air Traffic Control (ATC) radio communication the second highest priority, other (payload) communication is the third highest priority, and sensor or peripheral data is the fourth highest priority.

In general, network link monitor 304 can establish which modem(s) have the best link quality, and the higher priority packets can be routed via these modem(s). For example, at UAV 301 a modem with higher (or even the best) link quality can be used exclusively for telemetry data or exclusively for certain types of telemetry data (or radio communication data).

In another embodiment, higher priority packets can be routed via a plurality of (and possible all) modems and given a higher priority. Having higher priority, available bandwidth is allocated first to these packets. Packets with lower priority are relegated to being sent when remaining bandwidth permits.

Optionally, a packet distribution scheme may refrain from distributing data through one or more modems due to cost. For example, if sufficient bandwidth is available from cheaper to operate modems (e.g., 3G) then other costlier to operate modems (e.g., satellite) are not used. When appropriate, dictated at least in part by link characteristics, costlier modems can be used to transfer higher priority data. For example, if all the 3G modems in a vehicle are out of range of a cell tower, a satellite modem can be used to transfer tower radio communication, send telemetry, and receive vehicle commands until 3G service is again available.

Thus, in general, UAV 301 can control the routing of radio communication, data, audio, and video between control device 321 and other systems co-located with UAV 301 (e.g., at, integrated with, and/or attached to UAV 301). UAV 301 can give data types related to radio communication, data types related to monitoring specified (e.g., vehicle, flight, etc.) systems, and/or data types related to controlling specified (e.g., vehicle, flight, etc.) systems higher priority. Some telemetry data may be designated to have higher priority relative to other telemetry data and radio communication. For example, telemetry data indicating a low engine battery can be given a higher priority than telemetry data indicating temperature. Similarly, some types of commands may be designated have higher priority over other types of commands. For example, a command to electrically isolate a malfunctioning battery can be given a higher priority than a command for panning or tilting a camera.

Figure 4:
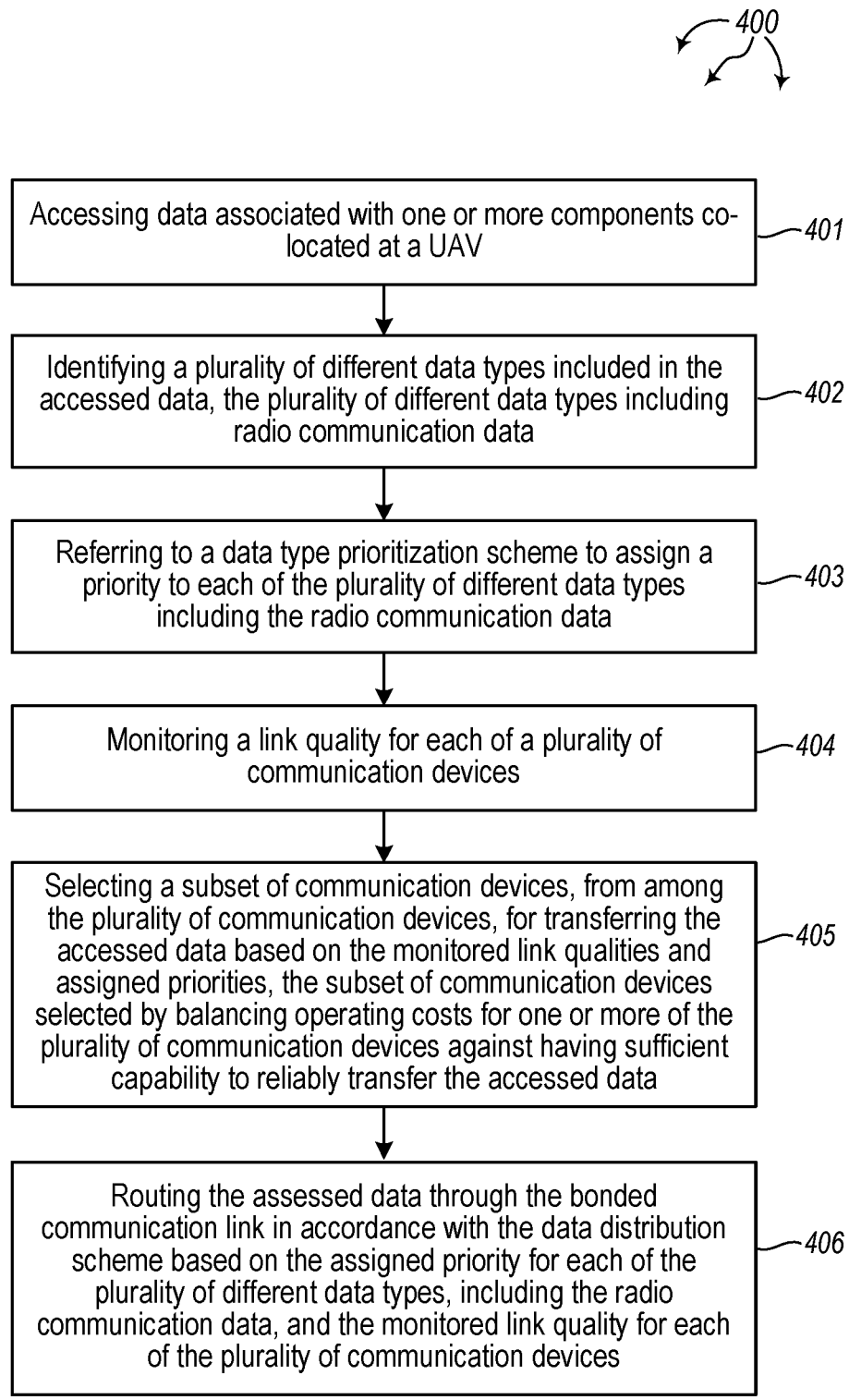
FIG. 4 illustrates a flow chart of an example method for prioritized transmission of different data types over bonded communication modules.

FIG. 4 illustrates a flow chart of an example method 400 for prioritized transmission of different data types over bonded communication modules. Method 400 will be described with respect to the components and data of computer architecture 300.

Method 400 includes accessing data associated with one or more components co-located with a UAV (201). For example, UAV 401 can access any of analog video 416, digital video 417, data 418, configuration 419, radio communication 482, and data 420.

Method 400 includes identifying a plurality of different data types included in the accessed data, the plurality of different data types including radio communication data (402). For example, packet inspector and prioritizer 305 can identify data types for any of: analog video 316, digital video 317, data 318, configuration 319, radio communication 382, and data 320. Method 400 includes referring to a data type prioritization scheme to assign a priority to each of the plurality of different data types including the radio communication data (403). For example, packet inspector and prioritizer 305 can refer to a data type prioritization scheme to assign a priority to any of: analog video 316, digital video 317, data 318, configuration 319, radio communication 382, and data 320.

Method 400 includes monitoring a link quality for each of a plurality of communication devices (404). For example, network link monitor 304 can monitor a link quality for each of modems 311-315. Link quality can be monitored on an ongoing basis, such as, for example, at specified intervals, in response to a request from any of modems 311-315, in response to a request from control device 321, when changes in data type or data volume are detected, when distance to a cell tower changes, when entering a new control area, etc.

Method 400 includes selecting a subset of communication devices, from among the plurality of communication devices, for transferring the accessed data based on the monitored link qualities and assigned priorities, the subset of communication devices selected by balancing operating costs for one or more of the plurality of communication devices against having sufficient capability to reliably transfer the accessed data (405). For example, network link monitor 304 can select modems 311-313 (a subset of modems 311-315) for transferring any of: analog video 316, digital video 317, data 318, configuration 319, radio communication 382, and data 320 to control device 321. The modems 311-313 can be selected based on the monitored link qualities for each of modems 311-315 and assigned priorities for any of: analog video 316, digital video 317, data 318, configuration 319, radio communication 382, and data 320.

The modems 311-313 can be selected to balance operating costs for one or more of modems 311-315 against having sufficient capability (e.g., bandwidth) to reliably transfer any of: analog video 316, digital video 317, data 318, configuration 319, radio communication 382, and data 320.

A selected subset of communication devices can change over time based on changes in monitored link qualities and/or changes to assigned data priorities.

Method 400 includes routing the accessed data through the bonded communication link in accordance with a data distribution scheme based on the determined priority for each of the plurality of different data types, including the radio communication data, and the monitored link quality for each of the plurality of communication devices (406). For example, packet distributor 302 can route any of: analog video 316, digital video 317, data 318, configuration 319, radio communication 382, and data 320 to control device 321 in accordance with a data distribution scheme. The routing can be based on the assigned priority for each of: analog video 316, digital video 317, data 318, configuration 319, radio communication 382, and data 320 and the monitored link quality for each of modems 311-315.

Routing the accessed data can include routing accessed data of one assigned priority over a first communication device included in the subset of communication devices. For example, packet distributor 302 can route radio communication 382 over modem 311. Routing the accessed data can include routing accessed data of another assigned priority over a second commutation device included in the subset of communication devices. For example, packet distributor 302 can route configuration 319 over modem 312. Routing the accessed data can include refraining from routing accessed data over any non-selected communication devices. For example, packet distributor 302 can refrain from routing any data over modems 314 and 315.

In one aspect, data of higher priority is routed over communication devices having higher link quality and data or lower priority is routed over communication devices having lower link quality.

In some aspects, audio and video have a lower priority than other types of data (video can have a lower priority than audio or vice versa). The other data types can be designated to have higher or lower priority relative to one another. Data type designations can be made by a vehicle owner, a vehicle operator (e.g., pilot), set by (e.g., Federal Aviation Administration (FAA)) standards or regulations, etc. For UAVs, higher priority can be given to (e.g., telemetry, command, and radio communication) data related to the air worthiness and safety of the UAV.

Control device 321 can be software running on a personal computer. An operator (e.g., a pilot) can use control device 321 to operate UAV 301 past line of sight and possibly a significant distance away, for example, from another state or country In some aspects, data is prioritized based on an associated input or output port. Thus, UAV 301 could prioritize based on data stream. For example, UAV 301 could prioritize zero or more digital inputs and/or zero or more analog inputs.

Control device 321 can be at a fixed location or can be mobile. For example, control device 321 can be in a mobile command center (e.g., a land based vehicle). When control device 321 is mobile, control device 321 can also include a plurality of modems bonded into a bonded link (e.g., replacing port 322). In some embodiments, depending on available communication modules, UAV 301 is at, integrated with, and/or attached to other components and control device 321 is at, integrated with, and/or attached to another aircraft. The other aircraft can be another UAV. As such, one UAV can serve as a relay between another UAV and a ground station or other control center.

Modems in a bonded link (either in UAV 301 or control device 321) can be of the same or different brands, types, capabilities, etc. For example, a bonded link can include any of 3G cellular, 4G cellular, satellite, Wi-Fi, WiMAX, etc., modems or interface cards. In some embodiments, operating costs can be balanced against reliability. A bonded link can include a number of cheaper to operate modems (e.g., 3G) along with other more costly to operate modems (e.g., satellite). The more costly to operate modems can be used when the cheaper to operate modems fail to provide sufficient bandwidth for safely operating a vehicle.

Aspects of invention can be used to prioritize the routing of radio (e.g., VHF airband) communication, video, audio, and data to and from vehicles. The vehicles can be a land based, aerial (fixed wing and/or rotary), marine based (submersible or non-submersible), or space based vehicles. Vehicles can have a vehicle operator (either in the vehicle or operating the vehicle remotely). In one aspect, a vehicle is a Remotely Piloted Aircraft (RPA).

UAVs and control devices can include computer network connectivity components (e.g., a Network Interface Card ("NIC") or cellular modem) for wired or wirelessly connecting the cameras, condensers and other components to a computer network. As such, modules, algorithms, components, etc., for routing prioritized data, audio and video through a bonded link can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for routing prioritized data, audio and video through a bonded link as well as any other connected computer systems and their components (e.g., in a control or command center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As such, modules, algorithms, components, etc., for routing prioritized data, audio and video through a bonded link can be operated (e.g., remotely) over the computer network. When a control system (e.g., control device 121) is used to control a vehicle (whether the vehicle is manned or unmanned), the control system can also be used to control routing prioritized data, audio and video at a vehicle through a bonded link.

In some aspects, routing prioritized radio (e.g., VHF airband) communication, data, audio, and video through a bonded link is provided though autonomous operation by a robotic vehicle or system. For example, a robotic vehicle or system can route prioritized data, audio and video through a bonded link.

Combined Aspects

In some aspects, RPA 101 includes one or more of the components and functionalities depicted in and described with respect to computer architecture 300. In other aspects, UAV 301 includes one or more of the components and functionalities depicted in and described with respect to computer architecture 100. Accordingly, the various described aspects can be integrated together and interoperate with one another. For example, RPA 101 can utilize a data prioritization scheme similar to UAV 301.

Aspects of the present invention may comprise or utilize a special purpose or general-purpose computer including computer hardware, such as, for example, one or more processors and system memory, as discussed in greater detail below. Aspects within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, Aspects of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between any of the described formats.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed between any of the described formats by any of the described components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A Remotely Piloted Aircraft (RPA), the Remotely Piloted Aircraft (RPA) comprising:
a processor; and
system memory coupled to the processor and storing instructions configured to cause the processor to:
receive Very High Frequency (VHF) radio communication from an aircraft control center via a radio network;
receive a request for a transponder code;
relay the Very High Frequency (VHF) radio communication through the Remotely Piloted Aircraft (RPA), including:
convert the Very High Frequency (VHF) radio communication to a cellular format, including converting the Very High Frequency (VHF) radio communication into one or more data packets representing the content of the Very High Frequency (VHF) radio communication, the one or more data packets including a data packet containing air traffic control (ATC) radio communication, each data packet included in one or more data packets having a data type label inserted into the packet header that is indicative of a type of data included in the data packet; and
prioritize routing of the data packet containing the air traffic control (ATC) radio communication over a data packet containing another type of data through one or more communication devices at the Remotely Piloted Aircraft (RPA) in accordance with a data prioritization scheme, wherein the packet containing the air traffic control (ATC) radio communication is assigned a higher priority than the data packet containing the other type of data based on the association with the Very High Frequency (VHF) radio communication, wherein the prioritized routing of the data packet containing the air traffic control (ATC) radio communication is through at least one bonded cellular modem at the Remotely Piloted Aircraft (RPA); and send the one or more data packets via a cellular network to a control station used to control the Remotely Piloted Aircraft (RPA).

2. The Remotely Piloted Aircraft (RPA) of claim 1, wherein the instructions configured to cause the processor to convert the Very High Frequency (VHF) radio communication into one or more data packets comprise instructions configured to cause the processor to convert the Very High Frequency (VHF) radio communication into a 4G cellular network format.

3. The Remotely Piloted Aircraft (RPA) of claim 1, wherein the instructions configured to cause the processor to send the one or more packets via a cellular network to a control station comprise instructions configured to cause the processor to send the one or more packets via a 4G cellular network.

4. The Remotely Piloted Aircraft (RPA) of claim 1, wherein the instructions configured to cause the processor to receive Very High Frequency (VHF) radio communication comprise instructions configured to cause the processor to receive radio voice communication via the radio network;
   wherein the instructions configured to cause the processor to convert the Very High Frequency (VHF) radio communication into one or more data packets comprise instructions configured to cause the processor to convert the radio voice communication into the cellular format; and
   wherein the instructions configured to cause the processor to send the one or more packets via the cellular network comprise instructions configured to cause the processor to send the radio voice communication via the cellular network in the cellular format.

5. The Remotely Piloted Aircraft (RPA) of claim 1, wherein the instructions configured to cause the processor to receive Very High Frequency (VHF) radio communication comprise instructions configured to cause the processor to receive Very High Frequency (VHF) airband radio communication.

6. A Remotely Piloted Aircraft (RPA), the Remotely Piloted Aircraft (RPA) comprising:
   a processor; and
   system memory coupled to the processor storing instructions configured to cause the processor to:
   receive one or more cellularly formatted data packets from a control station used to control the Remotely Piloted Aircraft (RPA) via a wireless communication network, the one or more data packets representing the content of Very High Frequency (VHF) radio communication directed to an aircraft control center, the one or more data packets including a data packet containing air traffic control (ATC) radio communication, wherein each data packet included in the one or more data packets has a data type label inserted into a packet header indicative of a type of data included in the data packet; receive a request for a transponder code;
   relay the one or more data packets through the Remotely Piloted Aircraft (RPA), including: prioritize routing of the data packet containing air traffic control (ATC) radio communication over a data packet containing another type of data through one or more communication devices at the Remotely Piloted Aircraft (RPA) in accordance with a data prioritization scheme, wherein the packet contained the air traffic control (ATC) radio communication is assigned a higher priority that the data packet containing the other type of data based on association with the Very High Frequency (VHF) radio communication, wherein the prioritized routing of the data packet containing the air traffic control (ATC) radio communication is through at least one bonded cellular modem at the Remotely Piloted Aircraft (RPA); and
   convert the one or more data packets into the Very High Frequency (VHF) radio communication; and
   transmit the Very High Frequency (VHF) radio communication via a radio network within reception range of the aircraft control center.

7. The Remotely Piloted Aircraft (RPA) of claim 6, wherein the instructions configured to cause the processor to receive one or more data packets via the wireless communication network comprise instructions configured to cause the processor to receive the one or more data packets via a cellular network or to receive the one or more data packets via a satellite network.

8. The Remotely Piloted Aircraft (RPA) of claim 6, wherein the instructions configured to cause the processor to receive one or more data packets representing the content of Very High Frequency (VHF) radio communication comprise instructions configured to cause the processor to receive one or more data packets representing the content of Very High Frequency (VHF) airband radio communication.

9. The Remotely Piloted Aircraft (RPA) of claim 6, wherein the instructions configured to cause the processor to receive one or more data packets comprise instructions configured to cause the processor to receive one or more data packets in a cellular format via a cellular communication network; and
   wherein the instructions configured to cause the processor to convert the one or more data packets to the Very High Frequency (VHF) radio communication comprise instructions configured to cause the processor to convert the one or more data packets in the cellular format into the Very High Frequency (VHF) radio communication.

10. The Remotely Piloted Aircraft (RPA) of claim 6, wherein the instructions configured to cause the processor to receive one or more data packets comprise instructions configured to cause the processor to receive data representative of a transponder code.

11. The Remotely Piloted Aircraft (RPA) of claim 6, wherein the instructions configured to cause the processor to convert the one or more data packets into the Very High Frequency (VHF) radio communication comprise instructions configured to cause the processor to convert one or more of: cellular communication or satellite communication into the Very High Frequency (VHF) radio communication.

12. The Remotely Piloted Aircraft (RPA) of claim 11, wherein the instructions configured to cause the processor to transmit the Very High Frequency (VHF) radio communication comprise instructions configured to cause the processor to transmit Very High Frequency (VHF) airband radio communication.

13. The Remotely Piloted Aircraft (RPA) of claim 6, wherein the packet containing the containing air traffic control (ATC) radio communication includes a data type label representative of video or audio communication.

14. The Remotely Piloted Aircraft (RPA) of claim 6, wherein prioritizing routing of the data packet containing the air traffic control (ATC) radio communication comprises prioritizing the data packet containing the air traffic control (ATC) radio communication based on a priority list, the priority list including, in decreasing levels of priority, telemetry navigation data, air traffic control (ATC) radio communication, other communication, and sensor or peripheral data including video or audio communication.

15. A method comprising:
receiving radio communication in a Very High Frequency (VHF) radio format from an aircraft control center via a radio network;
receive a request for a transponder code;
relaying the radio communication through a Remotely Piloted Aircraft (RPA), including:
converting the radio communication from the Very High Frequency (VHF) radio format into a cellular format, including converting the radio communication into one or more data packets representing the content of the radio communication, the one or more data packets compatible with transmission over a cellular network, the one or more packets including a data packet containing air traffic control (ATC) radio communication, each data packet included in one or more data packets having a data type label inserted into the packet header that is indicative of a type of data included in the data packet; and
prioritizing routing of the data packet containing the air traffic control (ATC) radio communication over a data packet containing another type of data through one or more communication devices at the Remotely Piloted Aircraft (RPA) in accordance with a data prioritization scheme, wherein the packet containing the air traffic control (ATC) radio communication is assigned a higher priority than the data packet containing the other type of data based on the association with the Very High Frequency (VHF) radio format, wherein the prioritized routing of the data packet containing the air traffic control (ATC) radio communication is through at least one bonded cellular modem at the Remotely Piloted Aircraft (RPA); and
sending the one or more data packets over the cellular network to a Remotely Piloted Aircraft (RPA) control station.

16. The method of claim 15, wherein converting the Very High Frequency (VHF) radio communication into one or more data packets comprises converting the Very High Frequency (VHF) radio communication into a 4G cellular network format.

17. The method of claim 15, wherein sending the one or more packets over a cellular network to a control station comprises sending the one or more packets via a 4G cellular network.

* * * * *